United States Patent [19]
Lauderdale

[11] 3,803,982
[45] Apr. 16, 1974

[54] CURVILINEAR SURFACE PLANER

[75] Inventor: Kenneth L. Lauderdale, New Castle, Pa.

[73] Assignee: Donald E. Tripp, New Wilmington, Pa. ; a part interest

[22] Filed: Dec. 4, 1972

[21] Appl. No.: 311,970

[52] U.S. Cl. .................................................. 90/31
[51] Int. Cl. ............................................. B23d 5/00
[58] Field of Search .................................. 90/31, 26

[56] References Cited
UNITED STATES PATENTS
2,000,394   5/1935   Jennings ................................. 90/31
FOREIGN PATENTS OR APPLICATIONS
2,636   0/1861   Great Britain ......................... 90/31

Primary Examiner—Francis S. Husar
Attorney, Agent, or Firm—Hymen Diamond

[57] ABSTRACT

A curvilinear surface is formed in work on a moveable table by moving a cutting tool over a curvilinear path. The tool is suspended from a clapper box which is mounted on a slide having a female dovetail mating with a male dovetail affixed to a saddle. The saddle is moveable, perpendicular to the movement of the table during a cutting operation, by rotation of a screw. A first bar is connected rigidly to the slide and is moveable and slideable with the slide. A second bar is pivotally connected to the first bar and guides the first bar and the tool to move in an arc having the same radius of curvature as the curvilinear surface.

7 Claims, 5 Drawing Figures

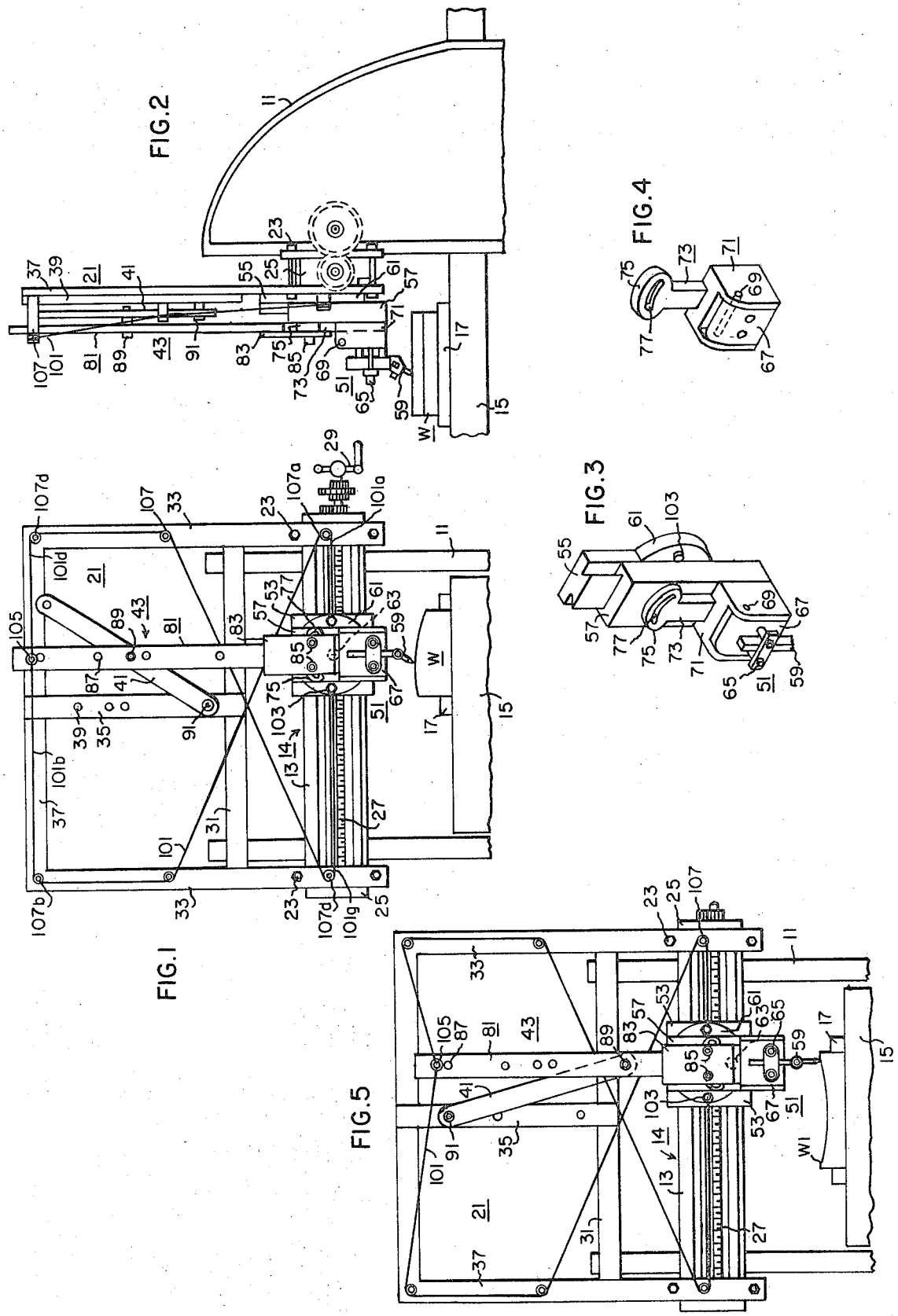

3,803,982

CURVILINEAR SURFACE PLANER

BACKGROUND OF THE INVENTION

This invention relates to work forming and has particular relationship to planers, shapers and the like for producing a curvilinear or non-linear surface in work. Typical apparatus for forming work in accordance with the teachings of the prior art includes a tool support which supports a tool in engagement with the work. The support is moveable in one direction, say horizontally, by rotation of a screw. The tool in its holder is moveable in the direction perpendicular to the one direction, say vertically, by rotation of another screw. The curvilinear surface is formed by setting the vertical movement of the tool to correspond to a dial indicator on a template as the horizontal movement progresses. This mode of forming a curvilinear surface is necessarily time-consuming and highly costly. Tracers may also be used to form curvilinear surfaces in work but tracer apparatus is complex and costly. Typical of the prior art also are U.S. Pats. to Hagman, No. 925,696, to Jennings, No. 2,000,394 and to Hyman, No. 2,618,203. But these patents disclose highly complicated apparatus whose cost is high and whose operation is complex.

It is an object of this invention to overcome the disadvantages of the prior art and to provide relatively low-cost work forming apparatus which shall operate in a simple manner without a template to form a curvilinear surface on work in a relatively short time and shall readily lend itself to mass production of work pieces with curvilinear surfaces at a low labor cost. Another object of this invention is to provide an adapter for adapting an available planer or shaper to the forming of curvilinear surfaces on work in a simple manner and at low labor cost.

SUMMARY OF THE INVENTION

In accordance with this invention the movement of the tool in cutting a curvilinear surface is effected by a linkage. The tool is suspended from a slide which is slideable in a tool support in the direction towards and away from the work. The support is moveable in the direction along the work, typically perpendicular to the direction in which the slide and tool are slideable, by a screw. The linkage includes a first bar connected rigidly to the slide and moveable therewith and a second bar, pivotally connected to the first bar. The second bar is pivoted about a fixed pivot as the first bar is moved by the screw and guides the first bar and the tool connected to it to trace an arc having the curvature of the curvilinear surface.

An available planer or shaper can be adapted to the practice of this invention by removing the screw which moves the slide towards and away from the work and then connecting the linkage to this slide with the pivotal bar having a fixed pivot on the frame of the machine. With reference to the planer shown in Jennings U.S. Pat. No. 2,000,394, the principal parts removed are the bevel gear 81, spindle 82, bevel gear 83, bearing 84, and handwheel 85 (FIG. 5). The linkage is connected to slide 80.

It has been found in the use of the apparatus according to this invention that the slide carrying the tool may tend to bind in its mating dovetail as the saddle carrying the tool support moves horizontally along the rail. An aspect of this invention arises from the realization that the tendency to bind is caused by the turning, relative to the slide, of the first bar of the linkage and the slide connected to it under the action of the pivotal bar of the linkage. The tendency to turn is suppressed by a taut cable which is secured to the tool support at its ends and near the end of the bar of the linkage which is secured to the slide. The cable, acting on the bar, centers the slide in the mating dovetail as the saddle is moved across to the work. The cable passes over rollers between the tool support and the bar and, as the saddle is moved in one direction or the other, its length on each side between the saddle and bar remains constant so that the slide does not turn relative to the dovetail.

BRIEF DESCRIPTION OF THE DRAWINGS

For a better understanding of this invention, both as to its organization and as to its method of operation, together with additional objects and advantages thereof, reference is made to the following description, taken in connection with the accompanying drawing, in which:

FIG. 1 is a view in front elevation showing apparatus in accordance with this invention for producing a convex curvilinear contour on work;

FIG. 2 is a view in end elevation of the apparatus shown in FIG. 1;

FIG. 3 is a fragmental view in perspective showing the tool assembly of the apparatus shown in FIG. 1 and the slide and mating dovetail along which the cutting tool is moved towards and away from the work;

FIG. 4 is a fragmental view in perspective showing the clapper box from which the cutting tool is suspended; and FIG. 5 is a view in front elevation showing apparatus according to this invention for producing a concave curvilinear contour on work.

DETAILED DESCRIPTION OF INVENTION

The apparatus shown in FIGS. 1 through 5 is a planer which may be a machine constructed in accordance with this invention or a conventional planer, as shown by Jennings U.S. Pat. No. 2,000,394, converted or modified in accordance with this invention. Only the parts of planer essential to the explanation of this invention are shown.

The planer includes upright supports 11 on which cross slides or rails 13 are mounted. The rails 13 are the long sides of a rectangular member 14. The rails 13 are provided with means (not shown) engaging the uprights 11. The member 14 including the rails 13 may be set (by a mechanism not shown) at vertical positions along the supports 11 suitable for the purposes of a cutting operation which is being carried out. The planer also includes a table 15, reciprocable (by mechanism not shown) in a direction perpendicular to the plane of the drawing between the supports 11. The table 15 is reciprocable on a bed (not shown). The work W is clamped to the table 15 by clamps 17. Typically, the work W may be a rocker for a bridge or the like which requires a curvilinear bearing surface for the bridge beams.

A frame 21 is secured by bolts 23 to the member 14 near its short sides 25. A screw 27 passes through the member 14 parallel to the rails 13, the short sides 25 including bearings (not shown) for the screw 27. A handwheel 29 is connected to the screw 27 and serves to rotate the screw.

The frame 21 is of generally U-shape but has a cross bar 31 extending between its legs 33. A bar 35 parallel to the legs 33 extends centrally between the cross bar 31 and the cross member 37 of the U-shape. The bar 35 has a plurality of openings 39 therein to provide fixed pivots for the pivotal bar 41 of the linkage 43.

The cutting tool assembly 51 is mounted moveable back and forth on the rails 13 by rotation of the screw 27. The assembly 51 includes a saddle 53 (FIG. 1) that carries a nut (not shown) which engages the screw 27 and is moved by rotation of the screw along the rails 13. The tool assembly 51 also includes a male dovetail 55 (FIG. 3) and a mating female dovetail 57 which are relatively slideable to set the vertical position of the tool 59. The male dovetail 55 carries a dowel 61 integral therewith. The dowel is mounted rotatable about a pin 63 (FIG. 1) in a groove in the saddle 53. The tool 59 is secured by bolts 65 to a clapper 67 which is suspended pivotally from a pin 69 extending between the walls of a clapper support 71. An arm 73 having a head 75 with an arcuate groove 77 extends from the clapper support 71.

The linkage 43 includes, in addition to the pivotal bar 41, a bar 81. The bar 81 has a head 83 and is secured to the female dovetail 57 by bolts 85 which pass through the groove 77 and securely clamp the clapper support 71 to the female dovetail 57. The bar 81, female dovetail 57 and the tool holder are thus secured together as a rigid unit capable of sliding vertically on male dovetail 55. The angular position of the male dovetail 55, female dovetail 57 and the parts connected to the female dovetail, including the tool 59, may be set by rotating the dowel 61 in its groove. The angular position of the clapper 67 and tool 59 alone may be set by loosening the bolts 85 and rotating the head 75.

The lever 41 is pivotally connected to bar 81. The bar 81 has along its length a number of holes 87 in which the pivot pin 89 may be inserted to accommodate the requirement to form concave or convex surfaces of different radius. The distance between the fixed pivot pin 91 and the moveable pivot pin 89 is equal to the radius of curvature to be formed. For a convex surface, the moveable pin 89 is above the fixed pin 91 as shown in FIGS. 1 and 2 and for a concave surface, the moveable pin 89 is below the fixed pin 91 (FIG. 5). In the interest of flexibility in use the pivotal bar 41 may also be provided with a plurality of holes.

To preclude binding of the mating dovetails 55 and 57, the dovetails are maintained parallel by a taut cable 101. The ends of the cable 101 are connected to bolts 103 on the dowel 61 and at an intermediate position, usually the center, the cable 101 is connected to pin 105 near the end of bar 81. Between the bolts 103 and the pin 105 the cable passes over pulley wheels 107.

Rotation of the screw 27 moves the saddle 53 and the bar 81, pivoting the bar 41 to move the female dovetail 57. The movement of the linkage 43 causes the tool 59 to trace an arc of radius equal to the distance between pivot pins 89 and 91. In the horizontal positions of the saddle the length of the cable 101 between each bolt 103 and the pin 105 remains constant. For example, if the saddle 53 moves to the right from the position shown in FIG. 1, the part 101a of the cable 101 between the bolt 103 on the right and the roller 107a shortens and the part 101b of the cable 101 between the roller 101b and the pin 105 lengthens by the same magnitude. Correspondingly, the part 101c of the cable between the bolt 103 on the left and the roller 107c lengthens and the part 101d of the cable between the pin 105 and the roller 107d shortens by the same magnitude. The bar 81, once set for smooth movement of the female dovetail 57, remains in this position.

In the use of the apparatus to cut a convex surface the saddle is set so that the bars 41 and 81 are colinear or coextensive. The work W is then clamped so that the cutting edge of the cutting tool 59 just contacts the center line which bisects the workpiece along the direction perpendicular to the plane of the curvilinear arc. The tool is then moved to one end of the work W and raised to a position where the cutting edge of the tool 59 is a short distance, typically about 1/8 inch below this edge. The cutting operation is then carried out from one side to the opposite side of the work in the direction perpendicular to the plane of the drawing. The work W is moved by the movement of table 15. The same operation is repeated for the opposite end of the work W. Curvilinear cuts are thus produced in the ends of the work W. The cutting edge of the tool 59 is then lowered another short increment below one end of the work W, say to one-fourth inch and another cut made. This process is continued with the tool being lowered after each cut until the curvilinear surface is produced.

The converse process is carried out in cutting a concave curvilinear surface in work W1 (FIG. 5). After centering the work W1 with the bars 41 and 81 colinear, the tool 59 is moved to one end of the work W1 and the cutting edge lowered so that it is a short incremental distance below its initial position at the end. An arcuate groove is then cut about the center line. Successive cuts are then taken with the tool lowered an incremental distance on each cut until the curvilinear surface is cut.

While preferred embodiments of this invention are disclosed herein, many modifications thereof are feasible. This invention is not to be restricted except insofar as is necessitated by the spirit of the prior art.

I claim:

1. Apparatus for forming a desired curvilinear surface on work including work cutting tool means, a support for said tool means for supporting said tool means linearly slideable in a predetermined first direction, in cutting relationship with said work, means moving said support with said tool means slideable therein in a second direction transversely to said first direction, and linkage means, connected to said tool means, and responsive to the movement of said work in said second direction, for positioning said tool means in said support along said first direction relative to said work in dependence upon the position of said support along said second direction, whereby the work-cutting path of said tool means follows a curvilinear path corresponding to the desired surface of said work, the said linkage means including a first bar rigidly connected to the tool means and moveable therewith in said first and second directions, a second bar pivotal about a fixed pivot and pivotally connected to said first bar, said tool means and the support for said tool means being moveable relative to said fixed pivot, said second bar being pivoted by said first bar as said first bar is moved in said second direction with the support for the tool means, thereby setting the position of the first bar and the tool means connected thereto in predetermined settings along the first direction corresponding to the position of said support for said tool means along said second direction.

2. The apparatus of claim 1 wherein the distance along the second bar between the fixed pivot and the pivotal connection to the first bar is substantially equal to the radius of curvature of the curvilinear surface.

3. The apparatus of claim 2 wherein the first and/or second bars are provided with means for selectively setting the distance between the fixed pivot and the pivotal connection in dependence upon the radius of curvature of the curvilinear surface.

4. Apparatus for forming a desired curvilinear surface on work including work-cutting tool means, a support for said tool means for supporting said tool means, linearly slideable in a predetermined first direction, in cutting relationship with said work, means moving said support with said tool means slideable therein in a second direction transversely to said first direction, said support for said tool means including a guide and said tool means including a member mating with said guide and slideable therealong to confine the movement of said tool means in said first direction; the said apparatus also including means, connected to said support and to said tool means, for maintaining said mating member substantially parallel to said guide to prevent binding of said mating member in said guide as said tool means is moved in cutting engagement with said work; and linkage means, connected to said tool means, and responsive to the movement of said work in said second direction, for positioning said tool means in said support along said first direction relative to said work in dependence upon the position of said support along said second direction, whereby the work-cutting path of said tool means follows a curvilinear path corresponding to the desired surface of said work, said linkage means including a bar rigidly connected to said tool means and slideable therewith in said support for said tool means along said first direction and moveable with said support along said second direction, said linkage means also including means, pivotally connected to said bar, for positioning said tool means in said first direction in dependence upon the position of said support in said second direction, and said parallel-maintaining means including cable means, connected at its ends to said tool support and also connected to said rod, for counteracting the tendency of said bar to actuate the mating member to turn out of alignment with said guide.

5. The apparatus of claim 1 wherein the first and/or second bars are provided with means for selectively setting the positions of the fixed pivot and the pivotal connection relative to the work in dependence upon whether the curvilinear surface is to be convex or concave.

6. An adapter apparatus for forming work, the said apparatus having cutting tool means, a support for said tool means in which said tool means is slideable in a first direction, and means connected to said support for moving said support in a second direction at an angle to said first direction, the said adapter including a first bar rigidly connected to said tool means and slideable therewith, and a second bar pivotal about a fixed pivot and pivotally connected to said first bar, said tool means and support being slideable and moveable relative to said fixed pivot and said second bar being pivotal about said fixed pivot as said first bar is moved with said support, said second bar restricting the movement of said tool to an arcuate path having a radius of curvature equal to the distance between said fixed pivot and said pivotal connection.

7. The adapter of claim 6 including means connected to the first bar and to the support for suppressing turning movement of said first bar and thus preventing binding of the tool means in the support.

* * * * *